(12) United States Patent
Guy et al.

(10) Patent No.: US 11,306,010 B1
(45) Date of Patent: Apr. 19, 2022

(54) WATER PURIFICATION MATERIAL AND METHOD FOR USE IN SANITIZING POOLS AND SPAS WHERE THE WATER PURIFICATION MATERIAL IS FREE OF ANTIMICROBIAL MATERIALS

(71) Applicant: King Technology Inc., Hopkins, MN (US)

(72) Inventors: David Guy, Maple Grave, MN (US); Joseph A King, Wayzata, MN (US); Randy Roseth, Chanassen, MN (US); Brett Libby, Edina, MN (US)

(73) Assignee: KING TECHNOLOGY INC

( * ) Notice: Subject to any disclaimer, the term of this patent is extended or adjusted under 35 U.S.C. 154(b) by 47 days.

(21) Appl. No.: 16/873,721

(22) Filed: Jun. 12, 2020

Related U.S. Application Data

(60) Provisional application No. 62/921,434, filed on Jun. 17, 2019.

(51) Int. Cl.
*C02F 1/50* (2006.01)
*C02F 1/72* (2006.01)
*C02F 103/42* (2006.01)

(52) U.S. Cl.
CPC ............ *C02F 1/50* (2013.01); *C02F 1/722* (2013.01); *C02F 2103/42* (2013.01); *C02F 2303/04* (2013.01); *C02F 2305/14* (2013.01)

(58) Field of Classification Search
CPC .... C02F 1/505; C02F 1/72; C02F 7/46; C02F 1/002; C02F 1/42; C02F 1/283; C02F 1/76

See application file for complete search history.

(56) References Cited

U.S. PATENT DOCUMENTS

| | | | | |
|---|---|---|---|---|
| 6,149,819 A | * | 11/2000 | Martin | C02F 1/76 210/743 |
| 2010/0230365 A1 | * | 9/2010 | Hill | C02F 1/76 210/744 |

* cited by examiner

*Primary Examiner* — Walter D. Griffin
*Assistant Examiner* — Cameron J Allen
(74) *Attorney, Agent, or Firm* — Johnson & Phung LLC

(57) ABSTRACT

A method and device for maintaining a body of water in a sanitized condition wherein the body of water is free from a source of bicidal metal ions and free from bromide or bromine compounds that can sanitize the body of water, the method including that steps of maintaining a chlorine level in the body of water at a level of between 1 ppm and 1.0 ppm; introducing a non-chlorine based oxidizing agent into the body of water wherein the chlorine level in combination with the oxidizing agent is selected so as to be insufficient to sanitize the body of water, and introducing a compound having a hydantoin ring therein into the body of water whereby the combination of the chlorine and the oxidizing agent sanitize the body of water without the presence of a source of biocidal metal ions to supplement the chlorine.

19 Claims, No Drawings

WATER PURIFICATION MATERIAL AND METHOD FOR USE IN SANITIZING POOLS AND SPAS WHERE THE WATER PURIFICATION MATERIAL IS FREE OF ANTIMICROBIAL MATERIALS

CROSS REFERENCE TO RELATED APPLICATIONS

This application claims priority to currently U.S. Provisional Application Ser. 62/921,434 filed Jun. 17, 2019.

FIELD OF THE INVENTION

This invention relates generally to recreational body of water and, more specifically to an apparatus and method of maintaining a body of water in a sanitized condition where the body of water is free from a source of biocidal metal ions and free from bromide or bromine compounds that can sanitize the body of water.

STATEMENT REGARDING FEDERALLY SPONSORED RESEARCH OR DEVELOPMENT

None

REFERENCE TO A MICROFICHE APPENDIX

None

BACKGROUND OF THE INVENTION

Description of the Prior Art

The art contains water purification materials for use in pools and spas that can be used to effectively maintain a biocidal effective bacterium count in the pool or spa while also having the desirable effect of maintaining a low level of free available chlorine in the pool or spa.

An example of such an effective water purification material is shown in King U.S. Pat. No. 7,347,934 which discloses "A two part biocide composition containing metal ions and bromine donor for killing microorganisms in a body of water and a method of killing microorganisms in a body of water by placing both biocidal metal ions and a bromine in the body of water to allow use of lower concentrations of bromine than if bromine were used alone as a biocide". In this example the halogen oxidizing agent and the biocidal metal ion i.e. silver reducing agent together with one of a group of chelating agents are used to sanitize pools or hot tubs.

An example a further effective water purification material is shown in King U.S. Pat. No. 9,187,351, which describes a method for maintaining a body of water in a sanitized condition that uses "A sanitizing agent for maintaining a biocidal effective bacteria count in a body of water comprising a metal ion donor for donating a metal ion and a compound containing a hydantoin ring with the combination of the compound containing the hydantoin ring with the metal ion donor enhancing the effectiveness of the sanitizing agent to enable the sanitizing agent to maintain a biocidal effective bacteria count in the body of water where the sanitizing agent may be added to the body of water in solid or nonsolid form." In this example, King uses an oxidizing agent such as chlorine or bromine and a reducing agent such as silver together with a hydantoin ring compound to sanitize the water in pools or hot tubs.

An example of a further water purification material is shown in Denkewicz et al U.S. Pat. No. 6,093,422 which describes a product for maintaining a body of water in a sanitized condition where "The composition contains sources of copper, zinc, and silver biocidal metal ions within a cross-linked polymer matrix. Examples of these ion sources include copper sulfate, zinc sulfate, and silver nitrate. An example of the cross-linked polymer matrix is cross-linked chitosan, which also serves to clarify the water and release the biocidal metal ions over time." Denkewicz et al goes on to state "The product is easy to manufacture, and allows the use of decreased halogen sanitizer, as well as decreased copper ion, thereby decreasing the likelihood of staining. The product simultaneously provides good bactericidal and algacidal properties, despite low levels of copper ion and low chlorine levels." Denkewicz uses an oxidizing agent such as chlorine or bromine and a reducing agent such as copper ions are used to sanitize the water in pools or hot tubs.

While chlorine is a well-known oxidizing agent for maintaining a pool or hot tub chlorine is known to have adverse effects as Denkewicz proposed to use reducing agents such as silver, zinc, copper and nickel in his water purification.

In each of the above examples the oxidizing agent, whether it be chlorine or bromine is supplemented with a reducing agent comprising a source of biocidal metal ions. While the prior art combinations of reducing agents such as antimicrobial metals with oxidizing such as chlorine or bromine have been used to limit the amount of halogen in the body of water it is known that metals typically have their own side effects.

SUMMARY OF THE INVENTION

A low cost, low free available chlorine level water purification composition providing effective water purification in a body of water such as a pool, hot tub or spa that eliminates the need for a reducing agent such as source of biocidal metal ions while maintaining a free available chlorine level in the body of water, which typically ranges between 0.5 ppm and 1.0 ppm, even though the water purification composition lacks a source of biocidal metal ions, which are commonly used for supplementing oxidizing agents such as chlorine and bromine in maintaining the body of water in a safe condition.

DESCRIPTION OF THE PREFERRED EMBODIMENT

In recreational waters, when chlorine is used as an antimicrobial agent for sanitization of a pool, hot tub or spa it is often desirous to maintain the free available chlorine level in the recreational waters as low as possible while still maintaining the chlorine effectiveness in sanitizing the recreational waters for safe use since recreational customers often complain of skin and eye irritation as well as discolored swimming wear after swimming in water containing higher levels of free available chlorine.

Unfortunately, since the antimicrobial form of chlorine, i.e. free available chlorine (hypochlorous acid), may be quickly be consumed by combining with various compounds to form chloramines in a recreation body of water due to environmental conditions and heavy use, chlorine often time needs to be replenished to maintain the chlorine's effectiveness.

Hydantoin derivatives can be used as antimicrobial agents. One particularly suitable hydantoin derivative is N-Halamine, comprising of a diverse class of biocides, which are characterized in the form of the functional group amines, amides or imides, which can form covalent bonds with chlorine ions, which is stabilized as oxidative biocidal halogen. The aforementioned N-Halamine has been found to be particularly efficacious because of their nontoxicity and non-irritation to humans and the environment, long-term stability and regenerability, and efficient biocidal activity against a broad spectrum of microorganisms including eliminating *E. coli* and bacteria such as *Proteus mirabilis* (*P. mirabilis*) and various potentially harmful microbial that may be present in bodies of recreational waters. It is also not possible for organisms to develop a resistance to them because halogen is the active oxidant. The N-Halamine can be obtained by exposing hydantoin (a 5-membered ring with nitrogen), to a source of chlorine or oxidizing agents, thereby "activating" the N-Halamine.

Non-chlorine oxidizing agents such as but not limited to dipersulfates, monopersulfates, peroxides, percarbonates, permanganates potassium peroxymonosulfate, and potassium monopersulfate have been discovered to be an effective pool oxidizer and works well with chlorine. The aforementioned non-chlorine oxidizing agents functions by not only destroying organic pool contaminants such as by eliminating odors in the recreational body of water, but also prevents chloramine formation.

The present invention includes a water purification composition for sanitization of a pool, hot tub or spa wherein the chlorine level in a body of water ranges between 0.5 ppm and 1.0 ppm where the water purification composition does not contain an antimicrobial metal, such as a source of biocidal metal ions, that can supplement the chlorine in maintaining the body of water in a safe condition.

A water purification composition and a method for maintaining a body of water suitable for recreational use is where the level of free chlorine in the body of water can be maintained at 1 ppm to 0.5 ppm even though the body of water does not contain a source of antimicrobial metal ions to supplement the chlorine. A feature of the water purification composition and method for maintaining a body of water suitable for recreational where the chlorine is maintained at 1 ppm or less is that the water purification composition does not contain any bromide of bromine compounds.

The water purification composition as described herein contains at least one hydantoin where the hydantoin is selected from the group consisting of 1,3-Dichloro-5,5-dimethylhydantoin (DCDMH) and 1,3-Dichloro-5-ethyl-5methylhydantoin (DCMEH).

A further feature of the water purification composition described herein is that body of water can be maintained in a safe condition with a chlorine level in the range of 0.5 ppm to 1.0 ppm through a periodic addition of a non-chlorine based oxidizing agent to the body of water.

To maintain the body of water in the safe condition one or more of the following non-chlorine based oxidizing agents can be used Dipersulfates, Monopersulfates, Peroxides, Percarbonates or Permanganates. In the method of purification of body of water with the water purification composition described herein is that the pH is maintained between 7.2-7.8 and the Alkalinity is maintained between 80-120 ppm.

The present invention is also an apparatus and method in maintaining a body of recreational water in a sanitized condition suitable for human use through the combination of a chlorine level in the body of recreational water that is insufficient to sanitize the body of recreational water by itself, a compound having a hydantoin ring that may or may not have antimicrobial properties, and a non-chlorine based oxidizing agent that when used alone in the body of recreational water is insufficient to sanitize the body of recreational water.

In one embodiment of the present invention the body of recreational water includes a chlorine concentration or chlorine level that is maintained between 0.5 ppm and 1.0 ppm, which typically is insufficient to sanitize body of recreational water. A compound having a hydantoin ring therein such as 1,3-Dichloro-5,5-dimethylhydantoin (DCDMH) or 1,3-Dichloro-5-ethyl-5methylhydantoin (DCMEH) is then added into the body of recreational water.

A non-chlorine based oxidizing agent such as dipersulfates, monopersulfates, peroxides, percarbonates, permanganates potassium peroxymonosulfate, potassium monopersulfate, or their combination is then added into the body of recreation water with the non-chlorine based oxidizing agent when used alone in the body of recreational water is insufficient to sanitize the body of recreational water for human partial immersion. The antimicrobial of the chlorine, and the antimicrobial active N-Halamine cooperating to sanitize the body of recreation water safe for human partial immersion in the body of recreation water without the presence of a source of antimicrobial metal ions to supplement the chlorine and without the need to add additional amounts of chlorine into the body of recreation water.

In regards to the compound having the hydantoin ring, it is noted that the compound having the hydantoin ring may be added to the body of recreation water in liquid form, granular form or in the form of a slow dissolving puck or tablets. Similarly, the non-chlorine based oxidizing agent may be added to the body of recreation water in liquid form, granular form or in the form of a slow dissolving puck or tablets. The compound having the hydantoin ring and the non-chlorine based oxidizing agent may also either be added to the body of recreation water as separate component or combined in the form of a one-piece slow dissolving puck or tablet.

An alternative embodiment of the present invention may comprise a dispenser for killing microorganisms in a body of recreation water free from a source of antimicrobial metal ions and free from bromide or bromine compounds and having a concentration of free available chlorine in the body of recreational water that is insufficient to sanitize the body of recreational water for human partial immersion in the body of recreation water. The dispenser includes a first housing having a compound having a hydantoin ring therein into the body of recreation water and a second housing having a water accessible compartment containing a non-chlorine based oxidizing agent that when used alone in the body of recreational water is insufficient to sanitize the body of recreational water. The compound having a hydantoin ring may be in the form of DCDMH and/or DCMEH and the non-chlorine based oxidizing agent may be in the form of dipersulfates, monopersulfates, peroxides, percarbonates, permanganates potassium peroxymonosulfate, potassium monopersulfate, or their combinations.

The oxidizing agent helps prevent chloramine formation. The combination of the non-chlorine based oxidizing agent, the increased free available chlorine, and the antimicrobial active N-Halamine in the body of recreation water cooperating to sanitize the body of recreation water safe for human partial immersion in the body of recreation water without the presence of a source of antimicrobial metal ions to supplement the chlorine and without the need to add additional amounts of chlorine into the body of recreation water.

The present invention also includes a method for maintaining a body of water in a sanitized condition where the body of water is free from a source of antimicrobial metal ions and free from bromide or bromine compounds that can sanitize the body of water that includes the steps of: (1) maintaining a concentration of free available chlorine in the body of recreation water that is insufficient to sanitize the body of recreational water for human partial immersion in the body of recreation water, (2) adding a compound having a hydantoin ring therein into the body of recreation water, and (3) periodically adding a non-chlorine based oxidizing agent The above method also includes the steps of (4) maintaining a concentration of free available chlorine in the body of recreation water between 0.5 ppm and 1.0 ppm, (5) adding DCDMH or DCMEH into the body of recreation water, (6) maintaining a concentration of free available chlorine in a pool, spa or hot tub that is insufficient to sanitize the pool, spa or hot tub for human partial immersion in the pool, spa or hot tub, (7) adding a compound having a hydantoin ring therein in granular form or in the form of a slow dissolving puck or tablets into the body of recreation water, (8) adding a non-chlorine based oxidizing agent in granular form or in the form of a slow dissolving puck or tablets into the body of recreation water.

We claim:

1. A method for maintaining a body of water in a sanitized condition where the body of water is free from a source of biocidal metal ions and free from bromide or bromine compounds that can sanitize the body of water comprising:
    maintaining a free chlorine level in the body of water at a level of between 1 ppm and 0.5 ppm;
    introducing a non-chlorine based oxidizing agent into the body of water wherein the chlorine level in combination with the oxidizing agent is selected so as to be insufficient to sanitize the body of water; and
    introducing a compound having a hydantoin ring therein into the body of water whereby the combination of the chlorine and the oxidizing agent sanitize the body of water without the presence of a source of biocidal metal ions to supplement the chlorine.

2. The method of claim 1 wherein the compound having a hydantoin ring comprises DCDMH.

3. The method of claim 1 wherein the compound having a hydantoin ring comprises DCMEH.

4. The method of claim 1 wherein the non-chlorine based oxidizing agent is selected from the group consisting of: dipersulfates, monopersulfates, peroxides, percarbonates or permanganates.

5. The method of claim 1 wherein adding the compound having the hydantoin ring comprises adding the compound in either tablet, pellet or granular form or combinations thereof.

6. The method of claim 1 wherein the compound having a hydantoin ring consists of DCDMH.

7. The method of claim 1 wherein the compound having a hydantoin ring consists of DCMEH.

8. A method for maintaining a body of recreation water in a sanitized condition where the body of water is free from a source of metal ions and free from bromide or bromine compounds that can sanitize the body of water comprising:
    maintaining a concentration of free available chlorine in the body of recreation water that is insufficient to sanitize the body of recreational water for human partial immersion in the body of recreation water; adding a compound having a hydantoin ring therein into the body of recreation water; and adding a non-chlorine based oxidizing agent into the body of recreation water that when used alone in the body of recreational water is insufficient to sanitize the body of recreational water, the oxidizing agent interacting with the chlorine in the body of recreational water to increase the antimicrobial of the chlorine while also interacting with the compound having the hydantoin ring.

9. The method of claim 8 wherein the free available chorine concentration in the body of recreational water is maintained between 0.5 ppm and 1.0 ppm.

10. The method of claim 8 wherein the step of adding a compound having the hydantoin ring therein into the body of recreation water comprises adding DCDMH or DCMEH into the body of recreation water.

11. The method of claim 8 wherein the body of recreation water comprises a pool, spa or hot tub.

12. The method of claim 8 wherein the compound having the hydantoin ring is in granular form.

13. The method of claim 8 wherein the compound having the hydantoin ring is in the form of a slow dissolving puck or tablets.

14. The method of claim 8 wherein the non-chlorine based oxidizing agent is in granular form.

15. The method of claim 8 wherein the non-chlorine based oxidizing agent is in the form of a slow dissolving puck or tablets.

16. The method of claim 8 wherein the compound having the hydantoin ring and the non-chlorine based oxidizing agent are combined in the form of a one-piece slow dissolving puck or tablet.

17. The method of claim 8 wherein the non-chlorine based oxidizing agent consist of dipersulfates, monopersulfates, peroxides, percarbonates, permanganates potassium peroxymonosulfate, potassium monopersulfate, or their combinations.

18. A dispenser for killing microorganisms in a body of recreation water free from a source of metal ions and free from bromide or bromine compounds and having a concentration of free available chlorine in the body of recreational water that is insufficient to sanitize the body of recreational water for human partial immersion in the body of recreation water comprising:
    a first housing having a compound having a hydantoin ring placeable into the body of recreation water; and
    a second housing having a water accessible compartment containing a non-chlorine based oxidizing agent that when used alone in the body of recreational water is insufficient to sanitize the body of recreational water, the oxidizing agent interacting with the chlorine in the body of recreational water to increase the antimicrobial of the chlorine while also interacting with the compound having the hydantoin ring to convert the compound having a hydantoin ring to an antimicrobial active N-Halamine to sanitize the body of water safe for human partial immersion in the body of recreation water without the presence of a source of metal ions to supplement the chlorine.

19. The dispenser of claim 18 wherein compound having a hydantoin ring comprises DCDMH or DCMEH and the non-chlorine based oxidizing agent consist of dipersulfates, monopersulfates, peroxides, percarbonates, permanganates potassium peroxymonosulfate, potassium monopersulfate, or their combinations.

* * * * *